(12) United States Patent
Ushiki et al.

(10) Patent No.: US 9,118,895 B2
(45) Date of Patent: Aug. 25, 2015

(54) DATA STRUCTURE, IMAGE PROCESSING APPARATUS, IMAGE PROCESSING METHOD, AND PROGRAM

(75) Inventors: Suguru Ushiki, Tokyo (JP); Kuniaki Takahashi, Tokyo (JP); Takafumi Morifuji, Tokyo (JP)

(73) Assignees: SONY CORPORATION, Tokyo (JP); SONY PICTURES ENTERTAINMENT, INC., Culver City, CA (US)

( * ) Notice: Subject to any disclaimer, the term of this patent is extended or adjusted under 35 U.S.C. 154(b) by 405 days.

(21) Appl. No.: 13/083,150

(22) Filed: Apr. 8, 2011

(65) Prior Publication Data

US 2011/0254926 A1    Oct. 20, 2011

(30) Foreign Application Priority Data

Apr. 16, 2010  (JP) ................................ 2010-095403

(51) Int. Cl.
*H04N 13/02*    (2006.01)
*H04N 13/00*    (2006.01)

(52) U.S. Cl.
CPC ....... *H04N 13/0048* (2013.01); *H04N 13/0018* (2013.01); *H04N 13/0066* (2013.01); *H04N 2213/002* (2013.01)

(58) Field of Classification Search
USPC ...................................................... 348/40–46
See application file for complete search history.

(56) References Cited

U.S. PATENT DOCUMENTS

| | | | |
|---|---|---|---|
| 7,180,663 B2 * | 2/2007 | Collender et al. ............. | 359/451 |
| 8,169,465 B2 * | 5/2012 | Mizobuchi et al. ............. | 348/43 |
| 2001/0030715 A1 * | 10/2001 | Tabata ............................ | 349/15 |
| 2006/0087556 A1 * | 4/2006 | Era ................................. | 348/51 |
| 2008/0089428 A1 | 4/2008 | Nakamura et al. | |
| 2010/0309289 A1 * | 12/2010 | Chen et al. ..................... | 348/46 |
| 2011/0199460 A1 * | 8/2011 | Gallagher ....................... | 348/46 |
| 2011/0234760 A1 * | 9/2011 | Yang et al. ...................... | 348/46 |
| 2011/0254919 A1 * | 10/2011 | Ushiki et al. ................... | 348/43 |
| 2011/0254926 A1 * | 10/2011 | Ushiki et al. ................... | 348/46 |
| 2013/0038703 A1 * | 2/2013 | Ushiki et al. ................... | 348/51 |

FOREIGN PATENT DOCUMENTS

| | | |
|---|---|---|
| JP | 10-327430 | 12/1998 |
| JP | 2008-182669 | 8/2008 |

* cited by examiner

*Primary Examiner* — Dave Czekaj
*Assistant Examiner* — Kehinde O Abimbola
(74) *Attorney, Agent, or Firm* — Oblon, McClelland, Maier & Neustadt, L.L.P.

(57) ABSTRACT

A reproduction apparatus reproduces image data of a left eye image and a right eye image of a 3D content recorded in a recording medium. The recording medium stores information about black border widths according to each parallax amount in periphery of right and left image frames between the left eye image and the right eye image. A post processing unit generates and outputs a border-attached left eye image and a border-attached right eye image by inserting an image having the obtained black border width according to the parallax amount in the periphery of the right image frame and an image having the obtained black border width according to the parallax amount in the periphery of the left image frame into the left eye image and the right eye image. The present invention can be applied to an image processing apparatus for processing image data of 3D images.

10 Claims, 14 Drawing Sheets

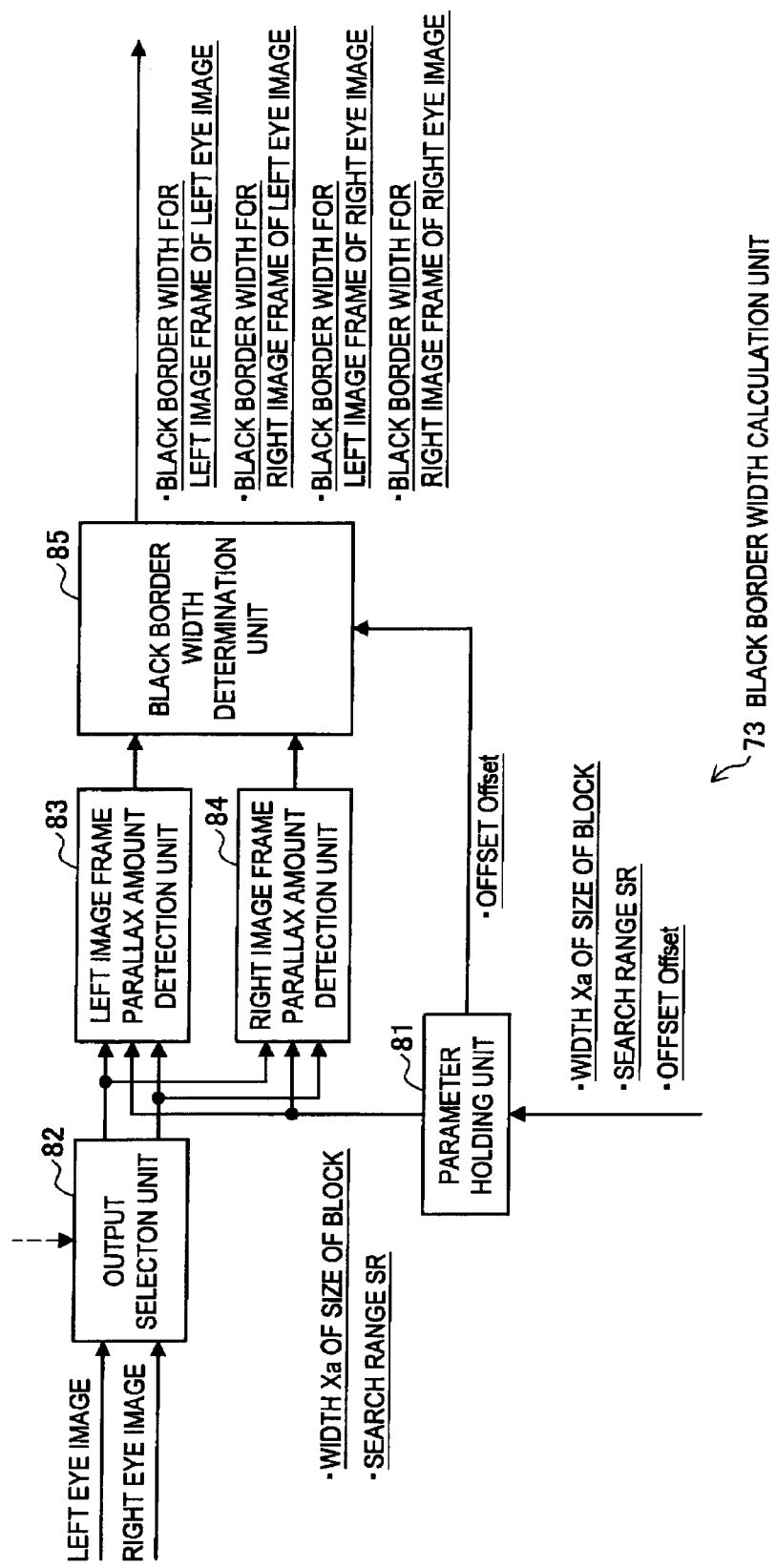

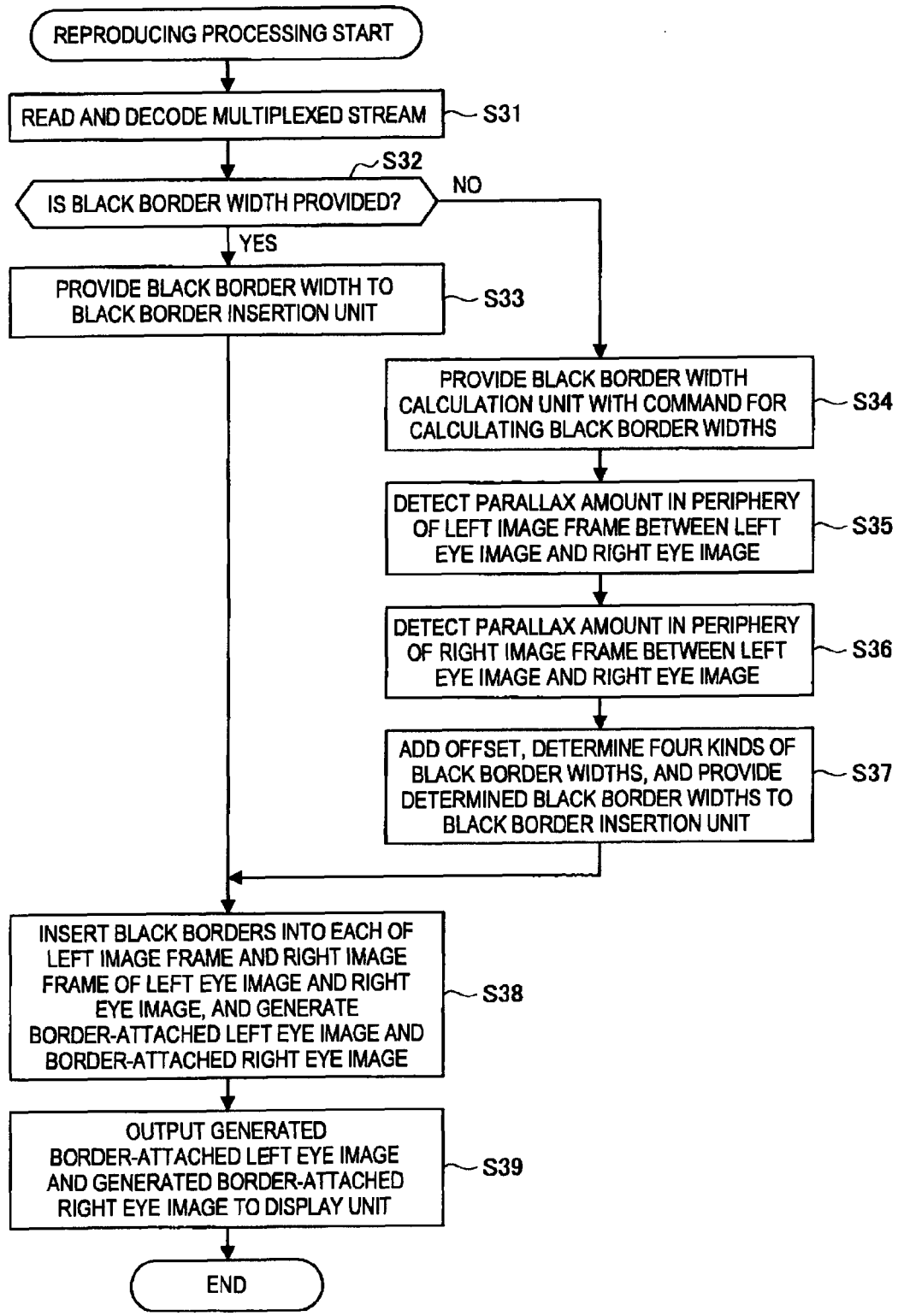

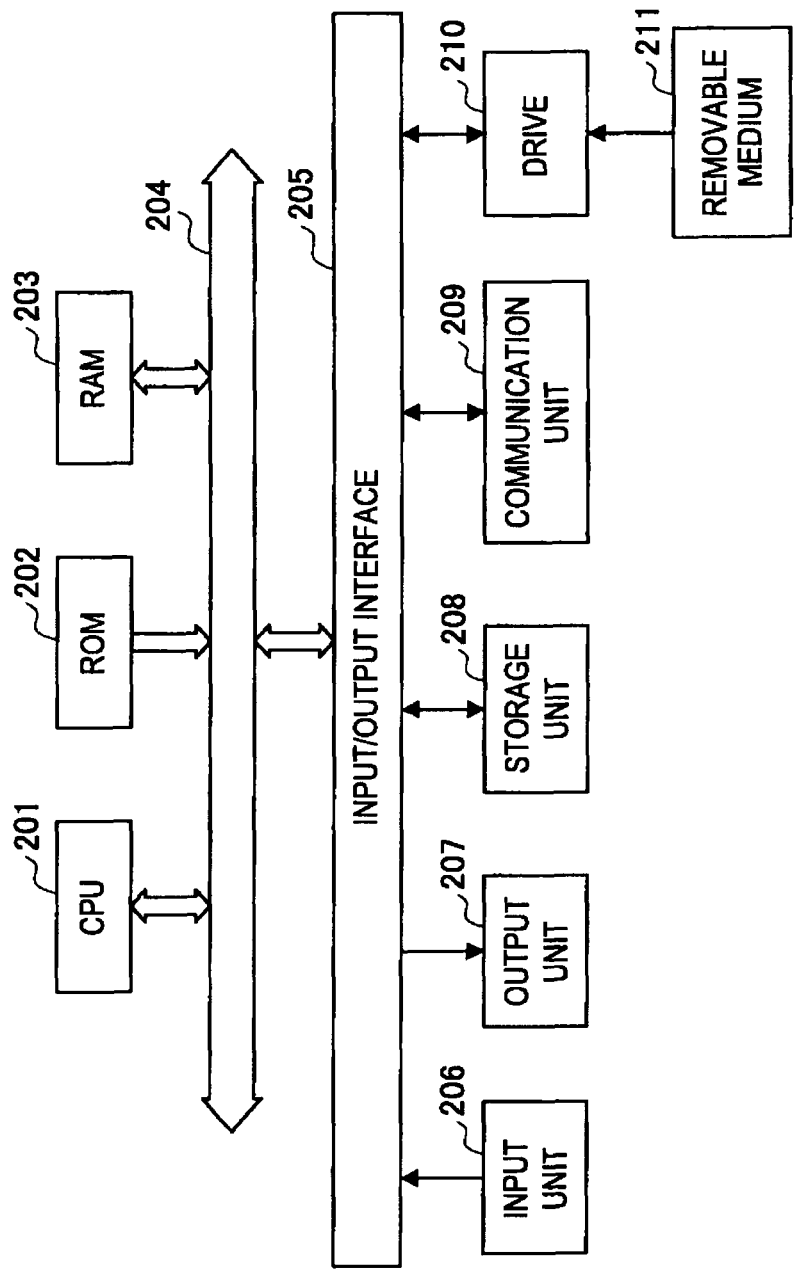

DATA STRUCTURE, IMAGE PROCESSING APPARATUS, IMAGE PROCESSING METHOD, AND PROGRAM

BACKGROUND OF THE INVENTION

1. Field of the Invention

The present invention relates to a data structure, an image processing apparatus, an image processing method, and a program, and more particularly, to a data structure, an image processing apparatus, an image processing method, and a program for allowing a user to watch a 3D content without feeling uncomfortable no matter whether the user watches the 3D content as a 3D image or a 2D image.

2. Description of the Related Art 2D images are mainly used as video contents. Recently, however, 3D images attract attention. For example, as shown in Japanese Patent Application Laid-Open Nos. 10-327430 and 2008-182669, various techniques have been suggested for 3D image display apparatuses and 3D image encoding and decoding methods.

A 3D image is constituted by a left eye image seen with a left eye and a right eye image seen with a right eye. Each of the left eye image and the right eye image has predetermined parallax, so that a user can recognize the images as a stereoscopic image.

Recent 3D movies employ a technique for inserting a black border to a periphery of an image frame in order to allow a user to easily see an image in the periphery of the image frame (exterior edge portion of the image). The size of the black border is dynamically changed according to the amount of parallax (parallax amount) in a scene. Accordingly, the black border is also referred to as a floating window.

FIGS. 1A to 1C are figures illustrating an example of insertion of a black border.

FIG. 1A is an example of a 3D image with the amount of protrusion being zero. In each of a left eye image and a right eye image, the display position of an apple is the same. Accordingly, the amount of protrusion is zero.

FIG. 1B is an example of a 3D image in which an apple appears to be protruding. When the 3D image of FIG. 1B are compared with the 3D image of FIG. 1A, it is understood that the apple in the left eye image in the 3D image of FIG. 1B is shifted to the right side (inner side of the image) by X. In other words, there is parallax between the apple in the left eye image and the apple in the right eye image, and the parallax amount is X. Accordingly, the apple appears to be protruding. However, no black border is inserted into the 3D image of FIG. 1B. The absence of black border makes a protrusion at the image frame. Accordingly, a user would have difficulty in seeing the 3D image (feel uncomfortable).

FIG. 1C is an example where a black border is inserted into the 3D image of FIG. 1B. The black border having the same width as the parallax amount X is inserted into the left eye image of FIG. 1C. As a result, the image is easy for the user to see.

SUMMARY OF THE INVENTION

However, not all the 3D contents, which will be widely available in the future, are images having black borders inserted thereto as described above. On the contrary, if all the 3D contents are assumed to have black borders inserted thereto all the time, this causes an issue in an environment where it may be difficult to see 3D contents as 3D images, e.g., shutter-attached glasses may not be prepared or the glasses are broken. This is because, for example, when only one of the left eye image and the right eye image is used to show it as a 2D image, the black border moves with scenes, which causes the image to appear to be unnatural.

The present invention is made in view of such circumstances, and allows a user to watch a 3D content without feeling uncomfortable no matter whether the user watches the 3D content as a 3D image or a 2D image.

According to an embodiment of the present invention, there is provided an image processing apparatus comprising an obtaining unit for obtaining image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image, and a generating unit for generating a border-attached left eye image and a border-attached right eye image by inserting an image having the obtained black border width according to the parallax amount in the periphery of the right image frame and an image having the obtained black border width according to the parallax amount in the periphery of the left image frame into the left eye image and the right eye image.

According to another embodiment of the present invention, there is provided an image processing method performed by an image processing apparatus including an obtaining unit for obtaining image data and a generating unit, the method comprising the steps of, causing the obtaining unit to obtain the image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image, and causing the generating unit for generating a border-attached left eye image and a border-attached right eye image by inserting an image having the obtained black border width according to the parallax amount in the periphery of the right image frame and an image having the obtained black border width according to the parallax amount in the periphery of the left image frame into the left eye image and the right eye image.

According to another embodiment of the present invention, there is provided a program for causing a computer to execute a processing comprising the steps of, obtaining image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image, and generating a border-attached left eye image and a border-attached right eye image by inserting an image having the obtained black border width according to the parallax amount in the periphery of the right image frame and an image having the obtained black border width according to the parallax amount in the periphery of the left image frame into the left eye image and the right eye image.

According to another embodiment of the present invention, image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image are obtained, and a border-attached left eye image and a border-attached right eye image by inserting an image having the obtained black border width according to the parallax amount in the periphery of the right image frame and an image having the obtained black border width according to the parallax amount in the periphery of the left image frame into the left eye image and the right eye image are generated.

According to another embodiment of the present invention, there is provided a data structure, a data structure comprising, image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image.

According to another embodiment of the present invention, image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image are included.

It should be noted that a program can be provided by transmitting the program via a transmission medium or recording the program to a recording medium.

The image processing apparatus may be an independent apparatus, or may be an internal block constituting one apparatus.

According to the first and second aspects of the present invention, a user can watch a 3D content without feeling uncomfortable no matter whether the user watches the 3D content as a 3D image or a 2D image.

BRIEF DESCRIPTION OF THE DRAWINGS

FIG. 12 is a block diagram illustrating a detailed exemplary configuration of a black border width calculation unit;

FIG. 13 is a flowchart illustrating reproduction processing performed by a reproduction apparatus of FIG. 8; and FIG. 14 is a block diagram illustrating an exemplary configuration of a computer according to an embodiment of the present invention.

DETAILED DESCRIPTION OF THE EMBODIMENTS

Figure 1:
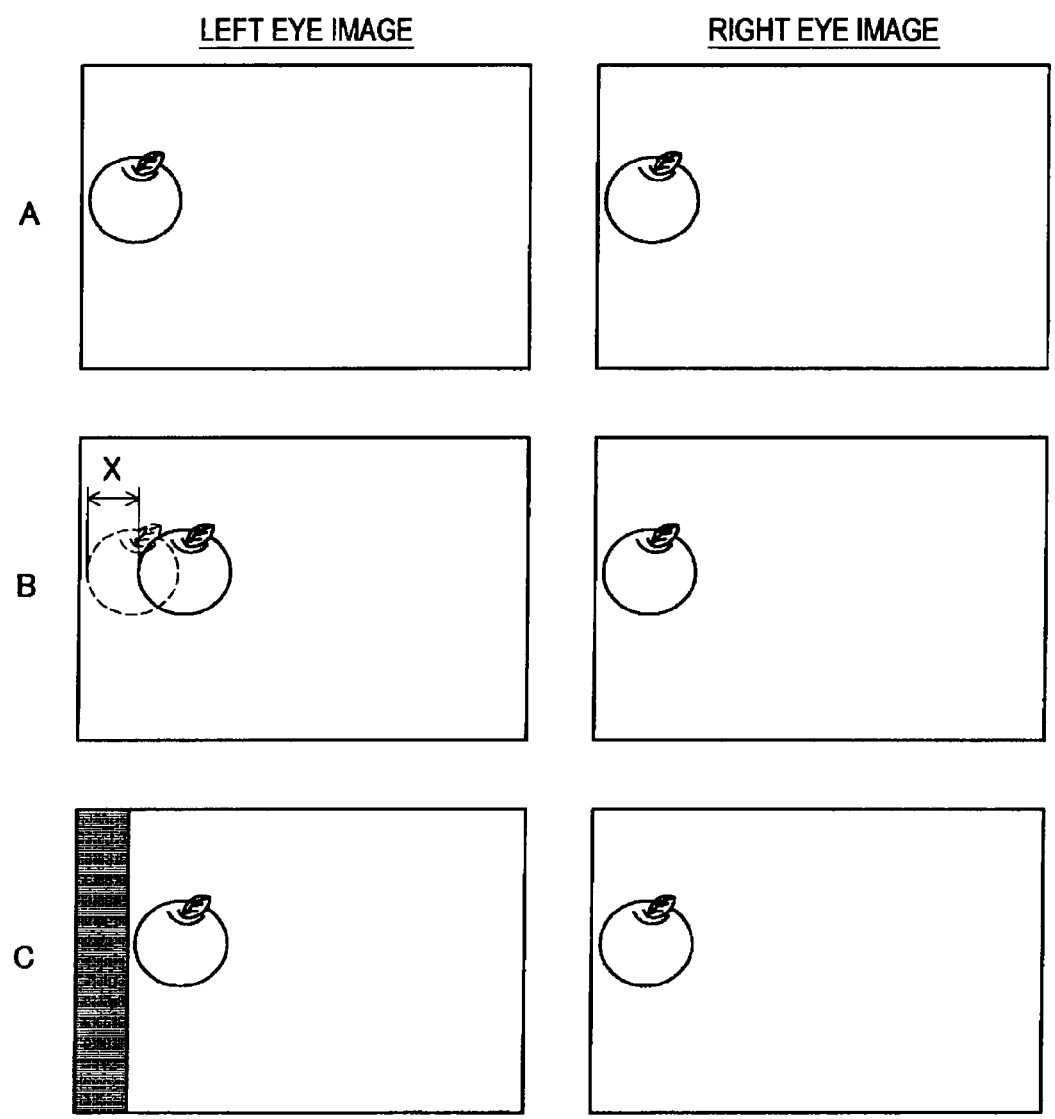
FIGS. 1A to 1C are figures illustrating examples of insertion of a black border.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Embodiment of Recording Apparatus>
[Exemplary Configuration of Recording Apparatus]

Figure 2:
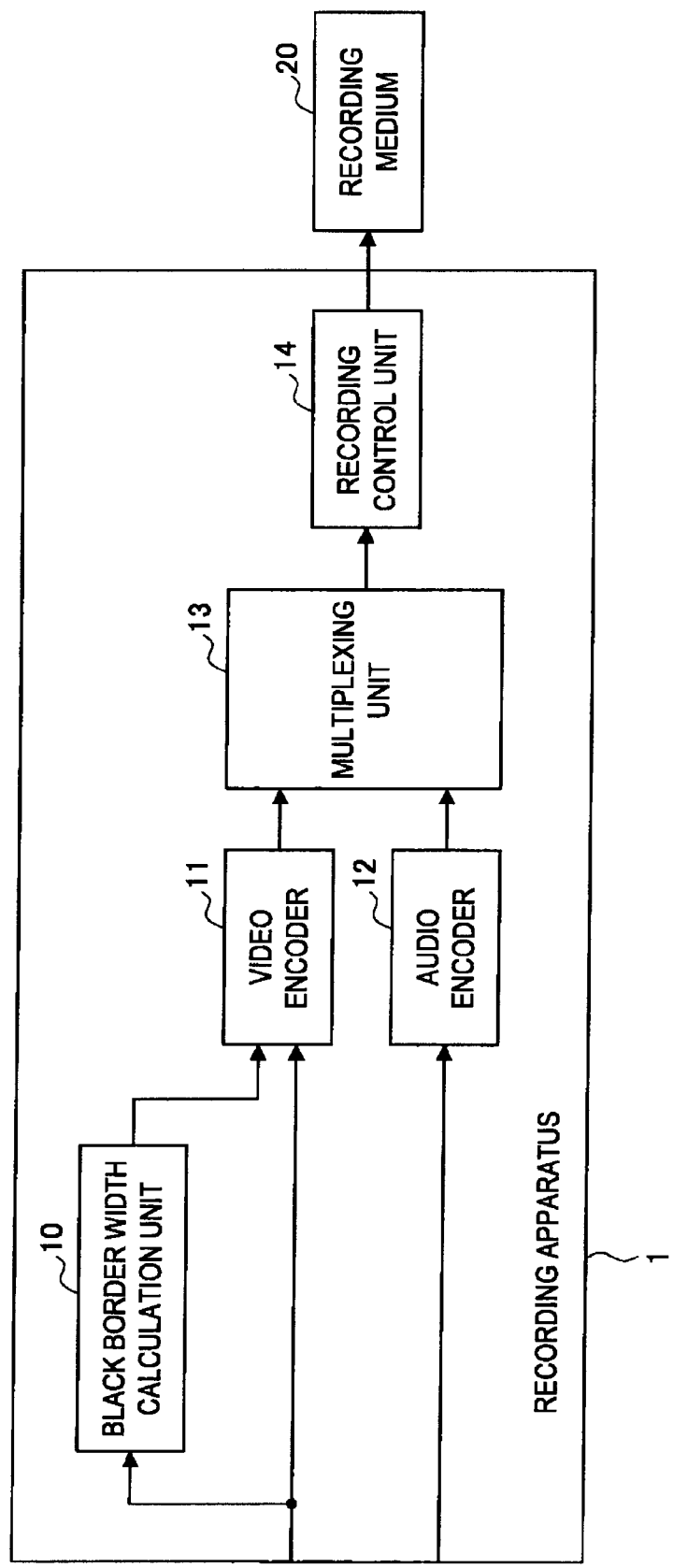
FIG. 2 is a block diagram illustrating an exemplary configuration of a recording apparatus according to an embodiment of the present invention.

FIG. 2 is a block diagram illustrating an exemplary configuration of a recording apparatus according to an embodiment of the present invention.

A recording apparatus 1 of FIG. 2 includes a black border width calculation unit 10, a video encoder 11, an audio encoder 12, a multiplexing unit 13, and a recording control unit 14.

The recording apparatus 1 encodes content data of a 3D content and records the content data to a recording medium 20 such as a BDROM (Blu-Ray (registered trademark) Disc Read Only Memory). The content data include image data of 3D images (which may be hereinafter referred to as 3D video data) and audio data corresponding to the image data. The 3D video data include image data for left eye images and image data for right eye images. The content data also include additional information about a width of a black border (hereinafter referred to as black border width) which is to be inserted into a periphery of an image frame in order to allow a user to easily see an image in the periphery of the image frame. Therefore, left eye images and right eye images in the 3D video data recorded in the recording medium 20 are images that do not include any black border for allowing a user to easily see the image in the periphery of the image frame.

The black border width calculation unit 10 of the recording apparatus 1 calculates, from 3D video data input from the outside, the black border width of the black border that is inserted to allow a user to easily see the image in the periphery of the image frame of the 3D image. More specifically, the black border width calculation unit 10 detects a parallax amount between the left eye image and the right eye image of the 3D video data, calculates the black border width according to the detected parallax amount, and provides the black border width to the video encoder 11. As explained later, the black border width may be calculated and set for each frame or field, or may be calculated and set for each unit constituted by multiple frames or fields, e.g., for each scene.

Although the details of the black border width calculation unit 10 will be explained in detail later in the explanation about the detailed configuration of a reproduction apparatus 50, the black border width calculation unit 10 will be briefly explained here. The black border width calculation unit 10 separately calculates a black border width for an image frame at the right side (hereinafter referred to as a right image frame) and a black border width for an image frame at the left side (hereinafter referred to as a left image frame) for each of the left eye image and the right eye image. In other words, the black border width calculation unit 10 calculates four black border widths, and provides the black border widths to the video encoder 11.

The video encoder 11 encodes the 3D video data and metadata input from the outside according to an encoding method such as MPEG2 (Moving Picture Experts Group phase 2), MPEG4, and AVC (Advanced Video Coding). The metadata include black border widths serving as the additional information of the 3D images. The video encoder 11 provides the multiplexing unit 13 with a video stream, i.e., ES (Elementary Stream), obtained as a result of the encoding.

The audio encoder 12 encodes audio data corresponding to the 3D video data input from the outside according to an encoding method such as MPEG and provides the multiplexing unit 13 with an audio stream, i.e., ES, obtained as a result of the encoding.

The multiplexing unit 13 multiplexes the video stream provided by the video encoder 11 and the audio stream provided by the audio encoder 12, and provides the recording control unit 14 with a multiplexed stream obtained as a result of the multiplexing.

The recording control unit 14 records the multiplexed stream provided by the multiplexing unit 13 to the recording medium 20.

The recording apparatus 1 has the above configuration.

[Explanation about Processing of Recording Apparatus]

Figure 3:
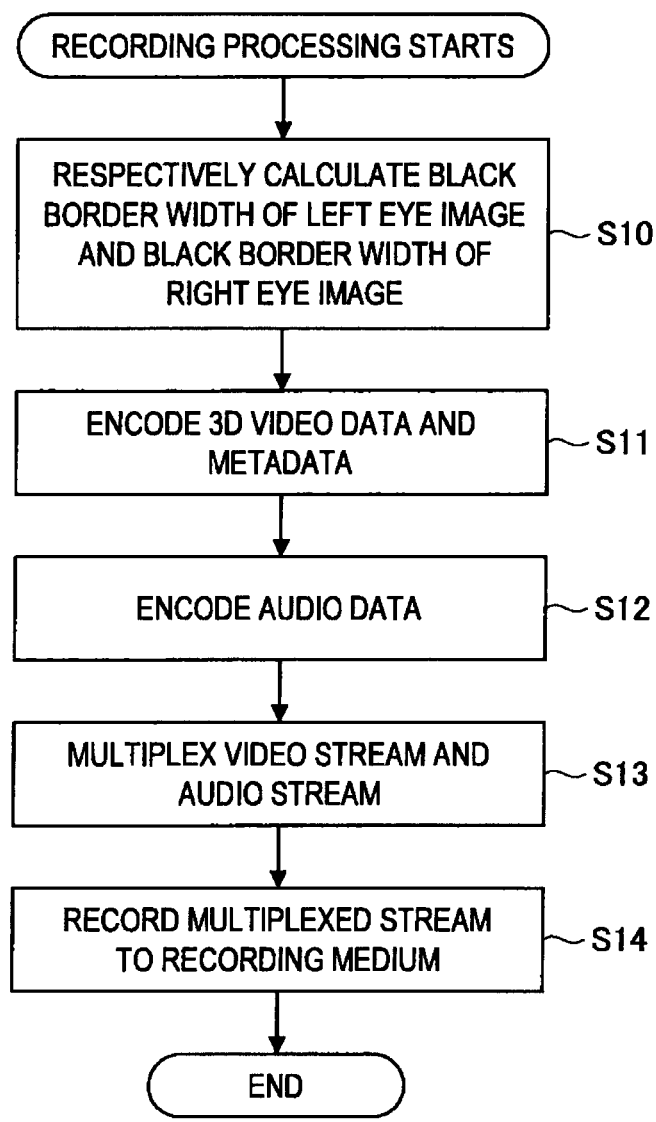
FIG. 3 is a flowchart illustrating recording processing performed by a recording apparatus of FIG. 2.

Subsequently, recording processing performed by the recording apparatus 1 of FIG. 2 will be explained with reference to the flowchart of FIG. 3. This recording processing starts when 3D video data and audio data are input, for example.

In step S10, the black border width calculation unit 10 respectively calculates the black border width of the left eye image and the black border width of the right eye image from the 3D video data input from the outside.

In step S11, the video encoder 11 encodes the 3D video data and the metadata input from the outside according to an encoding method such as MPEG2, MPEG4, and AVC. The metadata include each of the black border width for the left eye image and the black border width for the right eye image which are calculated in step S10. The video encoder 11 provides the multiplexing unit 13 with a video stream obtained as a result of the encoding.

In step S12, the audio encoder 12 encodes audio data corresponding to the 3D video data input from the outside according to an encoding method such as MPEG, and provides the multiplexing unit 13 with an audio stream obtained as a result of the encoding.

In step S13, the multiplexing unit 13 multiplexes the video stream provided by the video encoder 11 and the audio stream provided by the audio encoder 12, and provides the recording control unit 14 with a multiplexed stream obtained as a result of the multiplexing.

In step S14, the recording control unit 14 records the multiplexed stream provided by the multiplexing unit 13 to the recording medium 20, and terminates the processing.

As described above, the recording apparatus 1 records, to the recording medium 20, the 3D video data of the left eye image and the right eye image that do not include any black borders, and also record, to the recording medium 20, the additional information (metadata) about the black border widths which are used to insert the black borders to the left eye image and the right eye image. Therefore, when the 3D content recorded in the recording medium 20 is reproduced, and a user watches the 3D content as a 3D image, the recording apparatus 1 can display the 3D content upon inserting the black borders into the left eye image and the right eye image based on the black border widths provided as the additional information, so that the image in the periphery of the image frame is easy to see. Alternatively, when the 3D content recorded in the recording medium 20 is reproduced, and a user watches the 3D content as a 2D image, a 3D image can be reproduced because no black border is inserted therein. Accordingly, a viewer does not feel unnaturalness caused by the protruding image in the periphery of the image frame. Therefore, the recording apparatus 1 can provide the 3D content which a user can watch without feeling uncomfortable no matter whether the user watches the 3D content as a 3D image or a 2D image.

[Explanation about Storage Location of Additional Information]

Figure 4:
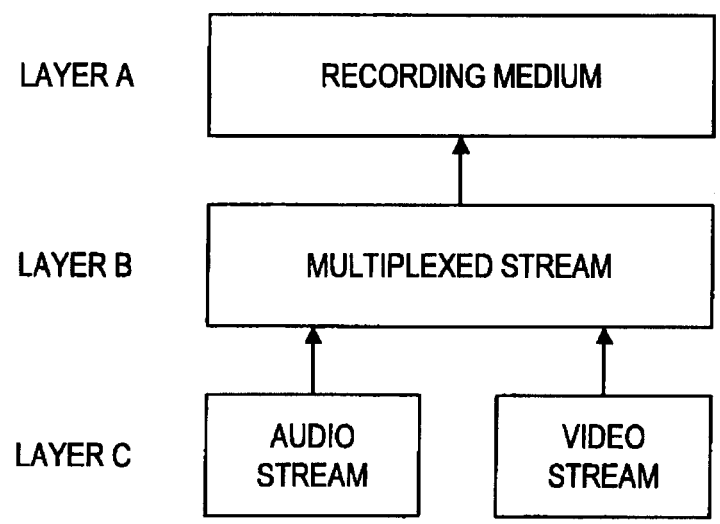
FIG. 4 is a figure illustrating a hierarchical structure of data recorded to a recording medium.

FIG. 4 is a figure illustrating a hierarchical structure of data recorded to the recording medium 20.

As shown in FIG. 4, a hierarchy of data recorded to the recording medium 20 includes a layer C of ES such as an audio stream and a video stream, a layer B serving as a system layer for a multiplexed stream, and a layer A of information unique to the recording medium 20. The "black border width", i.e., the additional information, may be recorded in one or more of the layer A, the layer B, and the layer C.

For example, when the additional information is recorded to the layer C, and the encoding method is AVC, the additional information is recorded as SEI (Supplemental Enhancement Information), or is recorded as a portion of PPS (Picture Parameter Set) and SPS (Sequence Parameter Set). When the encoding method is MPEG2, the additional information is recorded as video sequence or extension_and_user_data.

In this case, the additional information can be changed within one video stream, and therefore, "black border width" can be set for each of the left eye image and the right eye image or for each scene.

Alternatively, when the additional information is recorded to the layer B, the additional information is recorded to a private packet of TS (Transport Stream), a private pack of PS (Program Stream), and an extended region of box included in configuration information of MPEG4.

Figure 5:
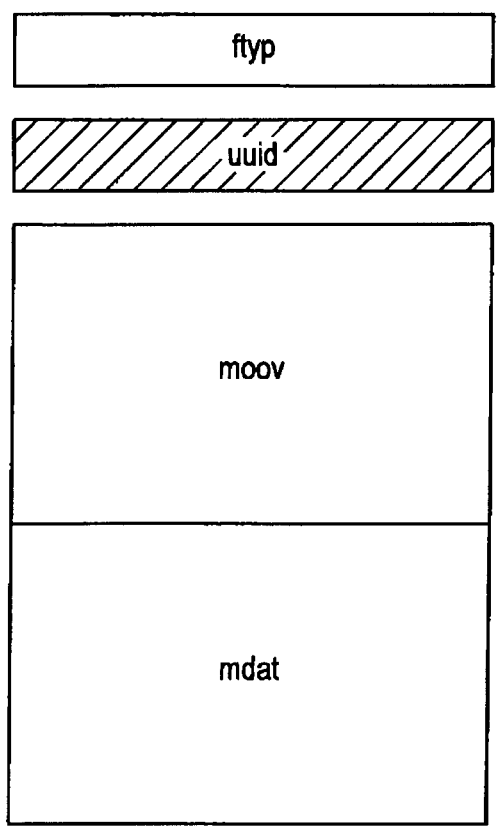
FIG. 5 is a figure illustrating an example of an extended region of a box of MPEG4.

For example, the extended region of box of MPEG4, in which the additional information is recorded, may be placed in Private Extension box (uuid in FIG. 5) immediately after ftyp box located at the head of the file as shown in FIG. 5. In this case, when the reproduction apparatus reproduces the 3D video data recorded to the recording medium 20, the reproduction apparatus can obtain "black border width", i.e., the additional information, before decoding processing, but the additional information is unchanging throughout a file.

It should be noted that the Private Extension box includes not only "black border width" but also the type of codec, bit rate, frame size, aspect ration, and information representing whether the image is 2D image or 3D image.

Figure 6:
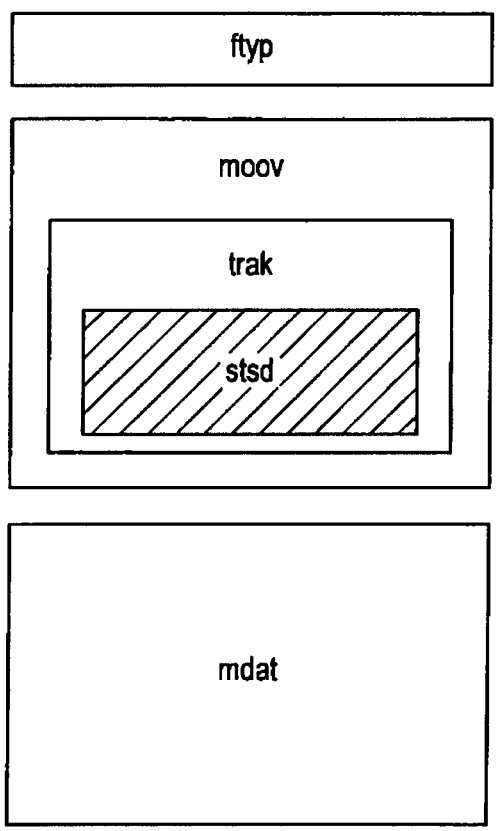
FIG. 6 is a figure illustrating another example of an extended region of a box of MPEG4.

Alternatively, the extended region of box of MPEG4, in which the additional information is recorded, may be placed in a region (stsd in FIG. 6) of track information (trak) in moov box as shown in FIG. 6. In this case, a video stream includes information representing the region of the additional information, which is referred to, and the reproduction apparatus obtains "black border width" based on the information. Therefore, in this case, the "black border width" can be changed within the video stream. Therefore, the "black border width" can be set for each of the left eye image and the right eye image or for each scene.

Figure 7:
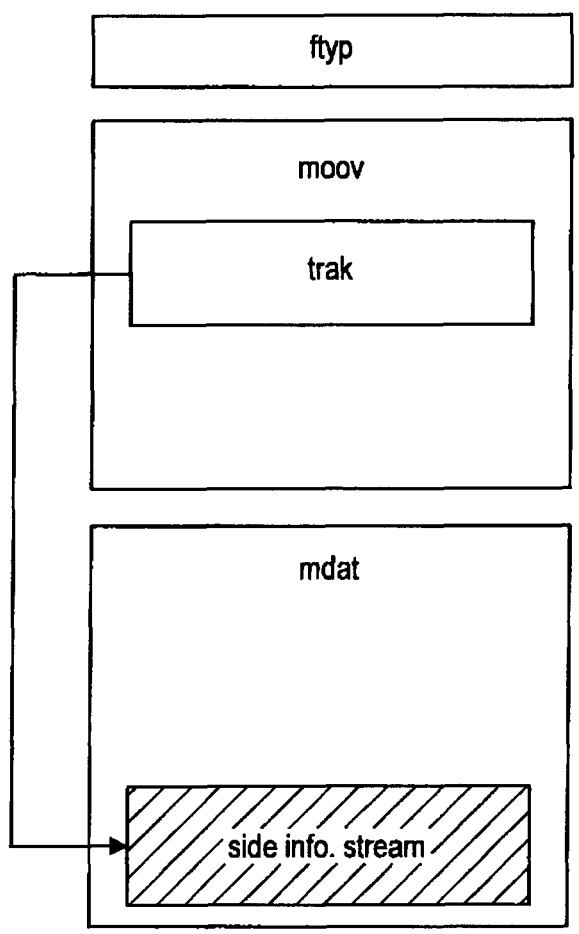
FIG. 7 is a figure illustrating still another example of an extended region of a box of MPEG4.

Alternatively, the extended region of box of MPEG4, in which the additional information is recorded, may be placed in mdat box as shown in FIG. 7. In other words, the additional information may be recorded as one medium stream (side info.stream). In this case, the video stream and the additional information are synchronized with time information, and therefore, the "black border width" can be set for each of the left eye image and the right eye image or for each scene.

In the examples of FIGS. 5 to 7, moov box and mdat box are arranged after ftyp box in this order. However, the arrangement of moov box and mdat box is not limited thereto.

<Embodiment of Reproduction Apparatus>

[Exemplary Configuration of Reproduction Apparatus]

Figure 8:
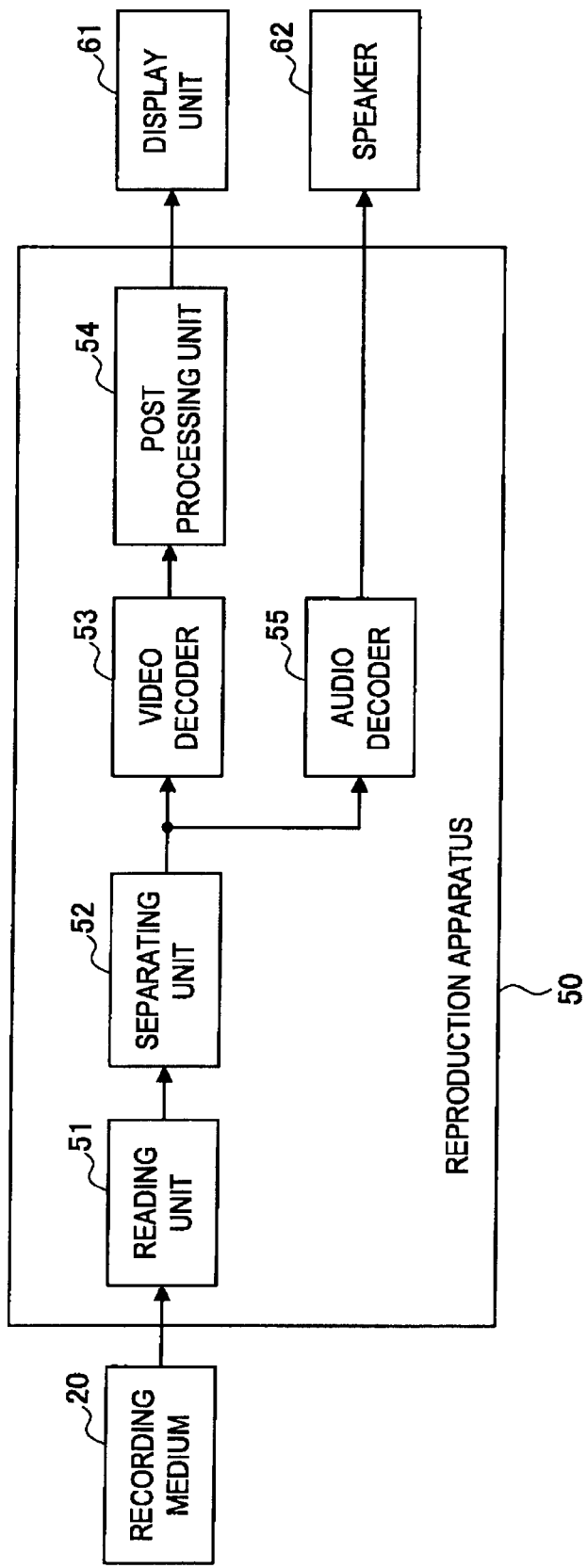
FIG. 8 is a block diagram illustrating an exemplary configuration of a reproduction apparatus according to an embodiment of the present invention.

FIG. 8 is a block diagram illustrating an exemplary configuration of a reproduction apparatus according to an embodiment of the present invention.

The reproduction apparatus 50 of FIG. 8 includes a reading unit 51, a separating unit 52, a video decoder 53, a post processing unit 54, and an audio decoder 55. The reproduction apparatus 50 reproduces the 3D video data recorded in the recording medium 20 and the audio data corresponding thereto, and displays a 3D image.

More specifically, the reading unit 51 of the reproduction apparatus 50 reads a multiplexed stream recorded in the recording medium 20, and provides the multiplexed stream to the separating unit 52.

The separating unit 52 separates the multiplexed stream provided by the reading unit 51 into a video stream and an audio stream. Then, the separating unit 52 provides the video stream to the video decoder 53, and provides the audio stream to the audio decoder 55.

The video decoder 53 decodes the video stream provided by the separating unit 52 according to a method corresponding to the encoding method performed by the video encoder 11 of FIG. 2, and provides the post processing unit 54 with 3D video data and metadata (additional information) obtained as a result of the decoding.

The post processing unit 54 performs processing (post processing) for inserting black borders into a left eye image and a right eye image of the 3D video data based on the black border widths provided as the additional information from the video decoder 53.

The post processing unit 54 outputs, to a display unit 61, image data of the left eye image and the right eye image having black borders inserted thereto.

The audio decoder 55 decodes the audio stream provided by the separating unit 52 according to a method corresponding to the encoding method performed by the audio encoder 12 of FIG. 2, and provides a speaker 62 with audio data obtained as a result of the decoding.

For example, the display unit 61 displays the left eye image and the right eye image based on the image data provided by the post processing unit 54 in a time-division manner. At this occasion, for example, a viewer wears a shutter-attached glasses which are in synchronization with switching between the left eye image and the right eye image, so that the viewer sees the left eye image with only his/her left eye, and sees the right eye image with only his/her right eye. Therefore, the viewer can recognize the 3D image stereoscopically.

The speaker 62 outputs a sound corresponding to the audio data provided by the audio decoder 55.

[Exemplary Configuration of Post Processing Unit 54]

Figure 9:
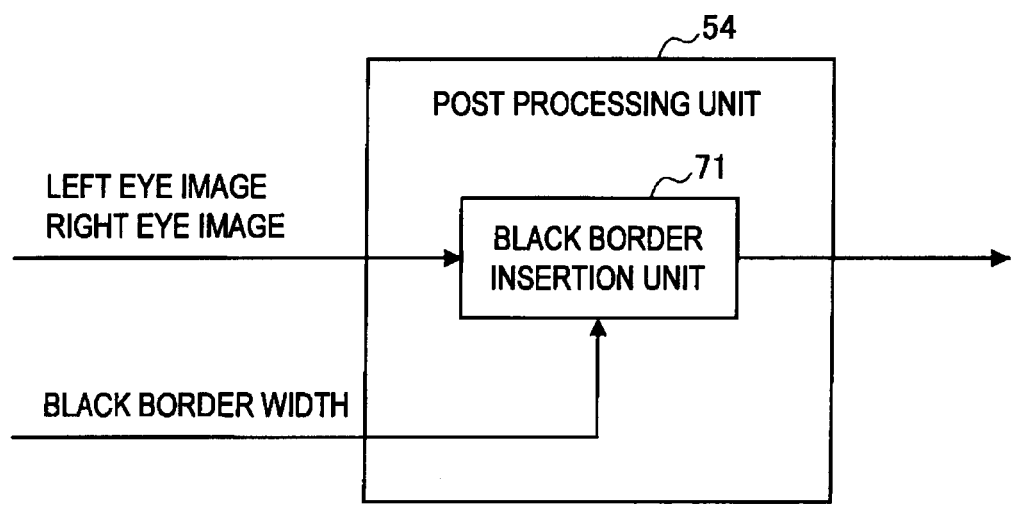
FIG. 9 is a block diagram illustrating a detailed exemplary configuration of a post processing unit.

FIG. 9 is a block diagram illustrating a detailed exemplary configuration of the post processing unit 54 of FIG. 8.

The post processing unit 54 includes a black border insertion unit 71.

The black border insertion unit 71 receives four kinds of black border widths from the video decoder 53. The four kinds of black border widths include black border widths of the right image frame and the left image frame of the left eye image and black border widths of the right image frame and the left image frame of the right eye image. The black border insertion unit 71 inserts (images of) black borders into the left eye image and the right eye image based on the received black border widths, and generates a border-attached left eye image and a border-attached right eye image. Then, black border insertion unit 71 outputs the image data of the generated border-attached left eye image and the generated border-attached right eye image to the display unit 61 (FIG. 8).

[Another Exemplary Configuration of Post Processing Unit 54]

Figure 10:
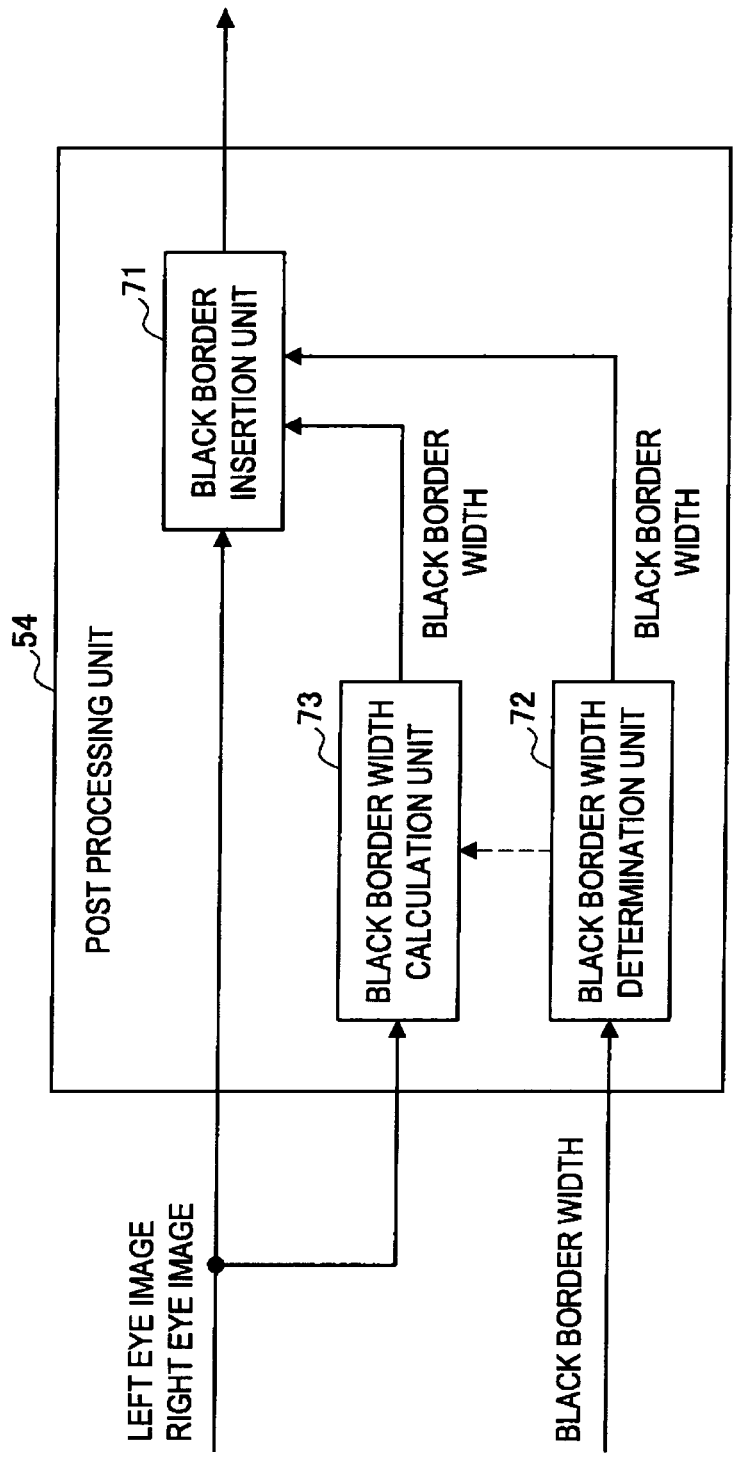
FIG. 10 is a block diagram illustrating another detailed exemplary configuration of a post processing unit.

FIG. 10 is a block diagram illustrating another detailed exemplary configuration of the post processing unit 54 of FIG. 8.

The post processing unit 54 of FIG. 10 can also work even when no black border width is recorded in the reproduced recording medium 20 as metadata. In other words, when the black border widths are recorded in the reproduced recording medium 20 as metadata, the post processing unit 54 uses the black border widths read from the recording medium 20, and generates the border-attached left eye image and the border-attached right eye image. On the other hand, when no black border width is recorded in the reproduced recording medium 20 as metadata, the post processing unit 54 of FIG. 10 calculates appropriate black border widths from the left eye image and the right eye image of the 3D video data, and uses the black border widths obtained from the result of the calculation to generate the border-attached left eye image and the border-attached right eye image.

The post processing unit 54 of FIG. 10 includes the black border insertion unit 71 similar to that of FIG. 9, a black border width determination unit 72, and a black border width calculation unit 73.

The black border width determination unit 72 determines whether black border widths are recorded in the recording medium 20 as metadata, i.e., whether the video decoder 53 provides the black border widths or not. When the video decoder 53 provides the black border widths, the black border width determination unit 72 provides the received black border widths to the black border insertion unit 71. On the other hand, when the video decoder 53 does not provide the black border widths, the black border width determination unit 72 provides the black border width calculation unit 73 with a command for calculating the black border widths.

When the black border width calculation unit 73 receives the command for calculating the black border widths from the black border width determination unit 72, the black border width calculation unit 73 calculates appropriate black border widths from the left eye image and the right eye image of the 3D video data provided by the video decoder 53, and provides the appropriate black border widths to the black border insertion unit 71.

[Processing of Black Border Width Calculation Unit 73]

Figure 11:
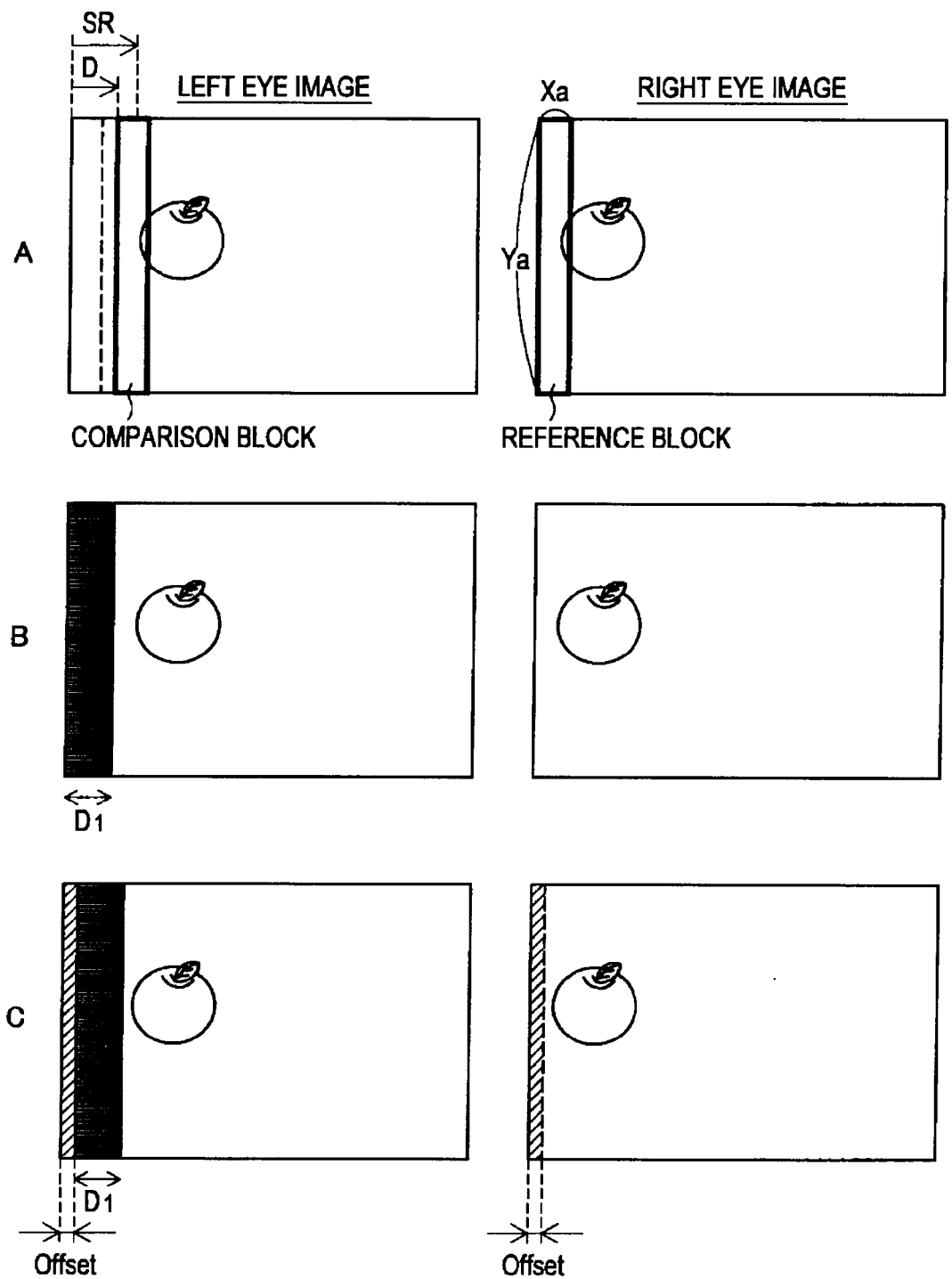
FIGS. 11A to 11C are figures illustrating calculation processing for calculating a width of a black border.

Subsequently, black border width calculation processing performed by the black border width calculation unit 73 will be explained with reference to FIGS. 11A to 11C, using an example of calculation of black border widths of a left image frame of a left eye image. It should be noted that the processing performed by the black border width calculation unit 10 (FIG. 2) of the recording apparatus 1 is the same as this processing.

First, the parallax amount in the periphery of the left image frame of the right eye image is calculated by comparing the received left eye image and the received right eye image. The parallax amount can be detected by various kinds of methods hitherto known. In this explanation about the present embodiment, it is detected by block matching.

The black border width calculation unit 73 receives a width Xa as a parameter. The width Xa determines a size of a block used for block matching. A height Ya of the block is the same as the size of the image.

As shown in FIG. 11A, in the right eye image, a block having the width Xa and the height Ya at the left edge is adopted as a reference block. Then, in the left eye image, the black border width calculation unit 73 moves a comparison block having the same size as the reference block to the right side by a predetermined amount (for example, one pixel) until the comparison block reaches a position where the amount of movement D is a search range SR, thus obtaining correlation values between the reference block and the comparison block. The amount of movement D having the highest correlation value is the parallax amount of the left image frame of the right eye image. The black border width calculation unit 73 adopts the parallax amount of the left image frame of the right eye image as a black border width for the left image frame of the left eye image.

FIG. 11B illustrates a border-attached left eye image generated by inserting a black border having a black border width which is equal to an parallax amount D1 of the left image frame of the right eye image.

It is known that, when both of the left eye image and the right eye image include black borders, correspondence between the right and left images can be obtained, which makes it easy to see the images. Accordingly, a parameter "offset" may be arranged to insert a black border also to an image (in the example of FIG. 11, the right eye image) on the side opposite to the image into which the black border has been inserted, so that both of the images for the right and left eyes have black borders inserted thereto all the time.

In the example of FIG. 11C, a predetermined offset is set, and the black borders are inserted into both of the left eye image and the right eye image.

In this manner, the black border widths of the right image frame and the left image frame can be calculated for each of the left eye image and the right eye image.

[Detailed Exemplary Configuration of Black Border Width Calculation Unit 73]

FIG. 12 is a block diagram illustrating a detailed exemplary configuration of a black border width calculation unit 73.

The black border width calculation unit 73 includes a parameter holding unit 81, an output selection unit 82, a left image frame parallax amount detection unit 83, a right image frame parallax amount detection unit 84, and a black border width determination unit 85.

The parameter holding unit 81 stores parameters as explained with reference to FIGS. 11A to 11C, i.e., the width Xa for determining the size of the block, the search range SR, and offset. Then, the parameter holding unit 81 provides, as necessary, the width Xa of the size of the block and the search range SR to the left image frame parallax amount detection unit 83 and the right image frame parallax amount detection unit 84, and provides the offset to the black border width determination unit 85. These parameters may be stored in advance as fixed values. Alternatively, these values may be input with an operation input unit and the like, not shown, as necessary or with predetermined timing.

The output selection unit 82 selects ON/OFF of the output of the received left eye image and the received right eye image, based on the command for calculating the black border widths which is provided from the black border width determination unit 72. In other words, when the black border width determination unit 72 provides the command for calculating the black border widths, the output selection unit 82 selects output-ON, so as to output the left eye image and the right eye image received from the video decoder 53 to the left image frame parallax amount detection unit 83 and the right image frame parallax amount detection unit 84. On the other hand, when the black border width determination unit 72 does not provide the command for calculating the black border widths, the output selection unit 82 selects output-OFF, so that the left eye image and the right eye image received from the video decoder 53 are not output. Therefore, when the black border width determination unit 72 does not provide the command for calculating the black border widths, the black border width calculation unit 73 does not calculate the black border widths.

The left image frame parallax amount detection unit 83 detects the parallax amount in the periphery of the left image frame between the received left eye image and the received right eye image, based on the width Xa of the size of the block and the search range SR provided from the parameter holding unit 81, and provides the detection result to the black border width determination unit 85. In other words, the black border width determination unit 85 receives the parallax amount detected by moving the comparison block of the left eye image while fixing the reference block at the left edge of the right eye image and the parallax amount detected by moving the comparison block of the right eye image while fixing the reference block at the left edge of the left eye image.

The right image frame parallax amount detection unit 84 detects the parallax amount in the periphery of the right image frame between the received left eye image and the received right eye image, based on the width Xa of the size of the block and the search range SR provided from the parameter holding unit 81, and provides the detection result to the black border width determination unit 85. In other words, the black border width determination unit 85 receives the parallax amount detected by moving the comparison block of the left eye image while fixing the reference block at the right edge of the right eye image and the parallax amount detected by moving the comparison block of the right eye image while fixing the reference block at the right edge of the left eye image.

The black border width determination unit 85 adds the offset provided by the parameter holding unit 81 to four parallax amounts provided by the left image frame parallax amount detection unit 83 and the right image frame parallax amount detection unit 84, thus determining four kinds of black border widths. In other words, the black border widths of the left image frame and the right image frame for the left eye image and the black border widths of the left image frame and the right image frame for the right eye image are determined and are provided to the black border insertion unit 71 (FIG. 10).

In the explanation above, four kinds of black border widths are determined for the left eye image and the right eye image. Alternatively, the black border widths of the left image frame and the right image frame may be commonly determined for the left image frame and the right image frame.

Each of the black border widths of the left image frame and the right image frame may also be commonly determined using a maximum value or an average value thereof. In other words, the black border widths of the left image frame and the right image frame may be the same value, e.g., the maximum value, the average value, and the like. In this configuration, it is less likely that a viewer has difficulty in seeing the images even when the black border widths of the left image frame and the right image frame are greatly different.

Further, the black border width may be smoothed and determined in a group including a plurality of left eye images or right eye images which are different in a temporal axis direction, e.g., in units of scenes. A representing value of the maximum value or the average value of each of the left image frame and the right image frame may be further smoothed and determined in a temporal axis direction.

The black border width calculation unit 10 of FIG. 2 has the same configuration as that of FIG. 12. However, the recording apparatus 1 is expected to calculate and record the black border widths. Therefore, the output selection unit 82 is maintained in output-ON state, or the output selection unit 82 is not provided.

In any of the black border width calculation unit 10 of FIG. 2 and the black border width calculation unit 73 of FIG. 12, the offset may be omitted.

[Explanation about Processing of Reproduction Apparatus]

Subsequently, reproduction processing will be explained with reference to a flowchart of FIG. 13. In the reproduction processing, the reproduction apparatus 50 including the post processing unit 54 having the configuration as shown in FIG. 10 reproduces images of a 3D content. For example, the reproduction processing starts when an command for reproducing a 3D content recorded in the recording medium 20 is given with an operation input unit and the like. In the state of FIG. 13 in which the processing starts, it is assumed that various parameters held in the parameter holding unit 81 are already provided to respective units which require the parameters.

In step S31, the reading unit 51 reads and decodes a multiplexed stream of the 3D content recorded in the recording medium 20. In other words, the reading unit 51 reads the multiplexed stream of the 3D content from the recording medium 20, and the separating unit 52 separates the multiplexed stream into a video stream and an audio stream. Then, the video decoder 53 decodes the video stream provided by the separating unit 52 according to a method corresponding to the encoding method of the recording apparatus 1. The 3D video data obtained as a result of decoding performed by the video decoder 53 are provided to the post processing unit 54. When the video stream includes black border widths, i.e., additional information, as metadata, the information about the black border widths is also provided to the post processing unit 54.

In step S32, the black border width determination unit 72 determines whether the video decoder 53 provides black border widths or not. When the video decoder 53 is determined to provide the black border widths, the processing of step S33 is subsequently performed. The received black border widths are provided to the black border insertion unit 71.

On the other hand, when the video decoder 53 is determined not to provide the black border widths in step S32, the processing of step S34 is subsequently performed. The black border width determination unit 72 provides the black border width calculation unit 73 with a command for calculating the black border widths. Accordingly, the output selection unit 82 of the black border width calculation unit 73 selects output-ON, so as to output the left eye image and the right eye image received from the video decoder 53 to the left image frame parallax amount detection unit 83 and the right image frame parallax amount detection unit 84.

Then, in step S35, the left image frame parallax amount detection unit 83 detects the parallax amount in the periphery of the left image frame between the received left eye image and the received right eye image, based on the width Xa of the size of the block and the search range SR provided from the parameter holding unit 81, and provides the detection result to the black border width determination unit 85.

In step S36, the right image frame parallax amount detection unit 84 detects the parallax amount in the periphery of the right image frame between the received left eye image and the received right eye image, based on the width Xa of the size of the block and the search range SR provided from the parameter holding unit 81, and provides the detection result to the black border width determination unit 85.

The processings of steps S35 and S36 may be performed in the opposite order or may be performed at the same time.

In step S37, the black border width determination unit 85 adds the offset to four parallax amounts provided by the left image frame parallax amount detection unit 83 and the right image frame parallax amount detection unit 84, thus determining four kinds of black border widths, and provides the determined black border widths to the black border insertion unit 71.

After the processings of step S33 or S37, the black border insertion unit 71 inserts black borders into each of the left image frame and the right image frame of the left eye image and the right eye image based on the received black border widths, and generates a border-attached left eye image and a border-attached right eye image in step S38.

Then, in step S39, the black border insertion unit 71 outputs the image data of the generated border-attached left eye image and the generated border-attached right eye image to the display unit 61, and terminates the processings.

In the above reproduction processing, when the black border widths, i.e., the additional information, are recorded in the recording medium 20 in addition to the image data of the 3D content, the black border widths are read, and the black borders can be inserted into the left image frame and the right image frame of each of the left eye image and the right eye image, so that the border-attached left eye image and the border-attached right eye image can be generated. Therefore, when a user watches the 3D content recorded in the recording medium 20 as a 3D image, the 3D image having black borders inserted thereto can be displayed on the display unit 61, so that the 3D image can be displayed without causing discomfort in the periphery of the image frame.

When the black border widths are not recorded in the recording medium 20 in addition to the image data of the 3D content, the reproduction processing is performed as follows. The parallax amount between the left eye image and the right eye image having been read out is detected, and a black border width appropriate for the parallax amount is determined, so that the border-attached left eye image and the border-attached right eye image having the black borders inserted thereto can be generated. Therefore, even when the content data of the 3D content recorded in the recording medium 20 do not include the information about the black border widths, the 3D image having the black borders inserted thereto can be displayed on the display unit 61, so that the 3D image can be displayed without causing discomfort in the periphery of the image frame.

The reproduction apparatus 50 may be provided with an operation input unit and a setting screen, which are used to set ON/OFF of insertion of black borders. In this case, when the insertion of black borders is turned off, and only one side of a 3D image is used to show the image as a 2D image, no image frame is displayed. Therefore, the user does not feel discomfort caused by unnecessary black borders.

Therefore, the reproduction apparatus 50 allows a user to watch a 3D content without feeling uncomfortable no matter whether the user watches the 3D content as a 3D image or a 2D image.

In the above example, the height Ya of the block used for the block matching is the same as the size of the image, and the black border width is set at the same width in each line of the image. Alternatively, the height Ya of the block used for the block matching may be less than the size of the image, and a plurality of blocks may be applied in a longitudinal direction (vertical direction). In this case, a plurality of black border widths may be set in the longitudinal direction by detecting respective parallax amounts. As the minimum unit, a black border width may be set for each line according to the parallax amount.

In the above example, the present invention is applied to the reproduction apparatus, and is explained as the embodiment of reproduction apparatus for inserting black borders upon reading information about black border widths recorded separately from the image data of the 3D content in the recording medium 20.

However, the present invention can also be applied to an apparatus other than the reproduction apparatus. For example, the image data of the 3D content and the information about the black border widths may be provided by a transmission via a network such as satellite broadcast, cable TV, and the Internet. Therefore, the present invention can be applied to a display apparatus and a recording/reproduction apparatus that receives the image data of the 3D content and the information about the black border widths transmitted by a transmission via a network, reads the information about the black border widths, inserts black borders into 3D images, and displays the 3D images having the black borders inserted thereto.

In other words, the present invention may be applied to an independent image processing apparatus that separately obtains the image data of the 3D content and the information about the black border widths, determines black border widths according to presence/absence of the information about the black border widths, generates border-attached left eye images and border-attached right eye images having black borders inserted thereto, and outputs the border-attached left eye images and the border-attached right eye images having black borders inserted thereto.

[Explanation about Computer to which the Present Invention is Applied]

The above series of processings may be performed by either hardware or software. When the series of processings are performed by software, a program constituting the software is installed in a general-purpose computer and the like.

FIG. 14 is an exemplary configuration of an embodiment of a computer to which the program for executing the above series of processings is installed.

The program may be previously stored in a storage unit 208 and a ROM (Read Only Memory) 202 serving as recording media incorporated into the computer.

Alternatively, the program may be stored (recorded) to a removable medium 211. This removable medium 211 may be provided as so-called package software. In this case, examples of the removable medium 211 include, for example, a CD-ROM (Compact Disc Read Only Memory), a MO (Magneto Optical) disk, a DVD (Digital Versatile Disc), a magnetic disk, and a semiconductor memory.

The program can be installed to the computer from the removable medium 211 as described above using a drive 210. Alternatively, the program may be downloaded to the computer via a communication network or a broadcast network, and the program can be installed to the storage unit 208 provided therein. In other words, the program can be received by the communication unit 209 via a wired or wireless transmission medium, and can be installed to the storage unit 208.

The computer has a CPU (Central Processing Unit) 201. The CPU 201 is connected to an input/output interface 205 via a bus 204.

When a user operates an input unit 206 to input a command to the CPU 201 via the input/output interface 205, the CPU 201 executes the program stored in the ROM 202 in response to the command. Alternatively, the CPU 201 loads the program stored in the storage unit 208 to a RAM (Random Access Memory) 203, and executes the program.

Thus, the CPU 201 performs the processings according to the above flowcharts or the processings performed with the configurations in the block diagrams as described above. Then, as necessary, the CPU 201 outputs the processing result thereof from an output unit 207 via the input/output interface 205, transmits the processing result thereof from the communication unit 209, or records the processing result thereof to the storage unit 208, for example.

The input unit 206 includes a keyboard, a mouse, and a microphone. The output unit 207 includes an LCD (Liquid Crystal Display), and a speaker.

In this specification, the processings performed according to the program by the computer may not be necessarily performed in time-series according to the order described in the flowcharts. In other words, the processings performed according to the program by the computer include processings executed independently or in parallel (for example, processing performed with objects or parallel processing).

The program may be processed by one computer (processor), or may be processed by a plurality of computers as distributed processing. Further, the program may be transferred to a computer located far away and may be executed.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-095403 filed in the Japan Patent Office on Apr. 16, 2010, the entire content of which is hereby incorporated by reference.

What is claimed is:

1. An image processing apparatus comprising:
an obtaining unit configured to obtain image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image; and
a generating unit configured to generate a border-attached left eye image and a border-attached right eye image by inserting an image having the obtained black border width according to the parallax amount in the periphery of the image frame into at least one of the left eye image and the right eye image and an image having the obtained black border width according to the parallax amount in the periphery of the left image frame into at least the other of the left eye image and the right eye image,
wherein at least one of the black border widths includes a width corresponding to the respective parallax amount and an offset separate from the respective parallax amount, and
wherein the offset is inserted on the same side of both the left eye image and the right eye image.

2. The image processing apparatus according to claim 1, further comprising:
a black border width calculation unit configured to detect the parallax amount in the periphery of the right image frame between the left eye image and the right eye image, to calculate the black border width according to the detected parallax amount in the periphery of the right image frame, to detect the parallax amount in the periphery of the left image frame between the left eye image and the right eye image, and to calculate the black border width according to the detected parallax amount in the periphery of the left image frame, wherein the obtaining unit obtains the black border widths calculated by the black border width calculation unit.

3. The image processing apparatus according to claim 2, further comprising:

a black border width determination unit configured to determine whether content data of the 3D content obtained from an outside include information about the black border width in addition to the image data of the left eye image and the right eye image, wherein when the black border width determination unit determines that the content data of the 3D content do not include the black border width, the black border width calculation unit calculates the black border width, and when the content data of the 3D content are determined to include the black border width, the obtaining unit obtains the information about the black border width included in the content data of the 3D content.

4. An image processing method performed by an image processing apparatus including an obtaining unit configured to obtain image data and a generating unit, the method comprising the steps of:

obtaining, using the obtaining unit, the image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image; and generating, using the generating unit, a border-attached left eye image and a border-attached right eye image by inserting an image having the obtained black border width according to the parallax amount in the periphery of the right image frame into at least one of the left eye image and the right eye image and an image having the obtained black border width according to the parallax amount in the periphery of the left image frame into at least the other of the left eye image and the right eye image, wherein at least one of the black border widths includes a width corresponding to the respective parallax amount and an offset separate from the respective parallax amount, and wherein the offset is inserted on the same side of both the left eye image and the right eye image.

5. A non-transitory computer-readable storage medium having stored thereon a program which, when executed by a processor of a computer, causes the computer to execute a processing comprising the steps of:

obtaining image data of a left eye image and a right eye image of a 3D content that has no black border inserted thereto, a black border width according to a parallax amount in a periphery of a right image frame between the left eye image and the right eye image, and a black border width according to a parallax amount in a periphery of a left image frame between the left eye image and the right eye image; and generating a border-attached left eye image and a border-attached right eye image by inserting an image having the obtained black border width according to the parallax amount in the periphery of the right image frame into at least one of the left eye image and the right eye image and an image having the obtained black border width according to the parallax amount in the periphery of the left image frame into at least the other of the left eye image and the right eye image, wherein at least one of the black border widths includes a width corresponding to the respective parallax amount and an offset separate from the respective parallax amount, and wherein the offset is inserted on the same side of both the left eye image and the right eye image.

6. A non-transitory computer-readable storage medium having stored thereon a data structure, which is used by a processor to display recorded 3D content on a display device, the data structure comprising:

image data of a left eye image and a right eye image of the 3D content that has no black border inserted thereto;

a black border width according to a parallax amount in a periphery of a right image frame between the left eye image and the right eye image; and a black border width according to a parallax amount in a periphery of a left image frame between the left eye image and the right eye image, wherein at least one of the black border widths includes a width corresponding to the respective parallax amount and an offset separate from the respective parallax amount, and wherein the offset is inserted on the same side of both the left eye image and the right eye image.

7. The image processing method according to claim 4, further comprising:

detecting, using a black border width calculation unit, the parallax amount in the periphery of the right image frame between the left eye image and the right eye image and calculating the black border width according to the detected parallax amount in the periphery of the right image frame, detecting, using the black border width calculation unit, the parallax amount in the periphery of the left image frame between the left eye image and the right eye image and calculating the black border width according to the detected parallax amount in the periphery of the left image frame, wherein the obtaining unit obtains the black border widths calculated by the black border width calculation unit.

8. The image processing method according to claim 7, further comprising:

determining, using a black border width determination unit, whether content data of the 3D content obtained from an outside include information about the black border width in addition to the image data of the left eye image and the right eye image, calculating the black border width using the black border width calculation unit, when the black border width determination unit determines that the content data of the 3D content do not include the black border width, and obtaining the information about the black border width included in the content data of the 3D content using the obtaining unit when the content data of the 3D content are determined to include the black border width.

9. The non-transitory computer-readable storage medium according to claim 5, the processing further comprising:

detecting the parallax amount in the periphery of the right image frame between the left eye image and the right eye image and calculating the black border width according to the detected parallax amount in the periphery of the right image frame, detecting the parallax amount in the periphery of the left image frame between the left eye image and the right eye image and calculating the black border width according to the detected parallax amount in the periphery of the left image frame, wherein obtaining image data includes obtaining the calculated black border widths.

10. The non-transitory computer-readable storage medium according to claim 9, the processing further comprising:

determining whether content data of the 3D content obtained from an outside include information about the black border width in addition to the image data of the left eye image and the right eye image, calculating the black border width when the black border width determination unit determines that the content data of the 3D content do not include the black border width, and obtaining the information about the black border width included in the content data of the 3D content when the content data of the 3D content are determined to include the black border width.

\* \* \* \* \*